United States Patent
Milton et al.

(10) Patent No.: US 9,499,047 B2
(45) Date of Patent: Nov. 22, 2016

(54) COMPRESSED NATURAL GAS FUELING SYSTEM WITH INTEGRATED FILL RECEPTACLE

(71) Applicant: dHybrid Systems, LLC, Saint George, UT (US)

(72) Inventors: Trevor Milton, Santa Clara, UT (US); Morgan Mackelprang, Cedar City, UT (US); Isaac Sloan, Saint George, UT (US); Ralph Hilton, Saint George, UT (US)

(73) Assignee: DHYBRID SYSTEMS, LLC, Columbus, OH (US)

(*) Notice: Subject to any disclaimer, the term of this patent is extended or adjusted under 35 U.S.C. 154(b) by 0 days.

(21) Appl. No.: 14/076,836

(22) Filed: Nov. 11, 2013

(65) Prior Publication Data

US 2014/0061266 A1    Mar. 6, 2014

(51) Int. Cl.
| | |
|---|---|
| B60K 15/03 | (2006.01) |
| B60K 15/07 | (2006.01) |
| F17C 13/08 | (2006.01) |
| B60R 9/06 | (2006.01) |
| F17C 5/06 | (2006.01) |
| B60K 15/063 | (2006.01) |

(52) U.S. Cl.
CPC ............ *B60K 15/07* (2013.01); *B60K 15/063* (2013.01); *B60R 9/06* (2013.01); *F17C 5/06* (2013.01); *F17C 13/084* (2013.01); *B60K 2015/0638* (2013.01); *B60Y 2200/148* (2013.01); *F17C 2201/0109* (2013.01); *F17C 2201/035* (2013.01); *F17C 2201/054* (2013.01); *F17C 2205/0107* (2013.01); *F17C 2205/0111* (2013.01); *F17C 2205/0142* (2013.01); *F17C 2221/033* (2013.01); *F17C 2223/0123* (2013.01); *F17C 2223/036* (2013.01); *F17C 2225/0123* (2013.01); *F17C 2225/036* (2013.01); *F17C 2250/043* (2013.01); *F17C 2270/0171* (2013.01)

(58) Field of Classification Search
CPC .................................... F17C 5/06; B60R 9/06
USPC .......... 180/69.5, 89.1, 89.11, 312, 313, 314; 224/404, 405; 280/1, 830; 296/37.6, 296/97.22, 146.1, 190.08, 93.01, 193.03
See application file for complete search history.

(56) References Cited

U.S. PATENT DOCUMENTS

| | | | | |
|---|---|---|---|---|
| 4,527,600 A | * | 7/1985 | Fisher et al. | 141/4 |
| 4,646,940 A | * | 3/1987 | Kramer et al. | 222/1 |
| 6,138,770 A | * | 10/2000 | Kayser | 172/677 |
| 2010/0078244 A1 | * | 4/2010 | Pursifull | 180/69.5 |

OTHER PUBLICATIONS

ACT Expo 2013, "State of the Art in an Evolving Natural Gas Industry", Jun. 24, 2013, 16 pgs.
Photos of a natural gas fueling system, printed on Oct. 25, 2013, 2 pgs.

* cited by examiner

*Primary Examiner* — Jacob Knutson
(74) *Attorney, Agent, or Firm* — Tucker Ellis LLP; Carlos P. Garritano

(57) ABSTRACT

A compressed natural gas fueling system includes a frame arrangement with at least one tank disposed therein and an inlet that can receive a compressed natural gas fueling nozzle to fill the at least one tank. The fueling system can be attached with and supported by frame rails behind a cabin of a vehicle such that the inlet is positioned above the frame rails.

6 Claims, 4 Drawing Sheets

COMPRESSED NATURAL GAS FUELING SYSTEM WITH INTEGRATED FILL RECEPTACLE

TECHNICAL FIELD

This disclosure relates to on-board compressed natural gas storage (CNG) systems for vehicles powered by CNG.

BACKGROUND

Compressed natural gas (CNG) may be used as a fuel for certain vehicles. Unlike gasoline, CNG is typically stored in several on-board high-pressure tanks These tanks and associated componentry may be retrofit to the vehicle after initial assembly.

SUMMARY

A compressed natural gas fuel system includes a housing that can be disposed behind a cabin of a truck, at least one tank within the housing, and an inlet that can receive a compressed natural gas fueling nozzle and be in fluid communication with the at least one tank. The housing can further be attached with and supported by frame rails of the truck such that the at least one tank and inlet are positioned above the frame rails.

A compressed natural gas fuel system includes a frame that can be disposed behind a cabin of a truck, a plurality of tanks within and supported by the frame, and a fill receptacle that can receive compressed natural gas for at least one of the tanks The frame can further be supported by frame rails of the truck such that the tanks and fill receptacle are positioned above the frame rails.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
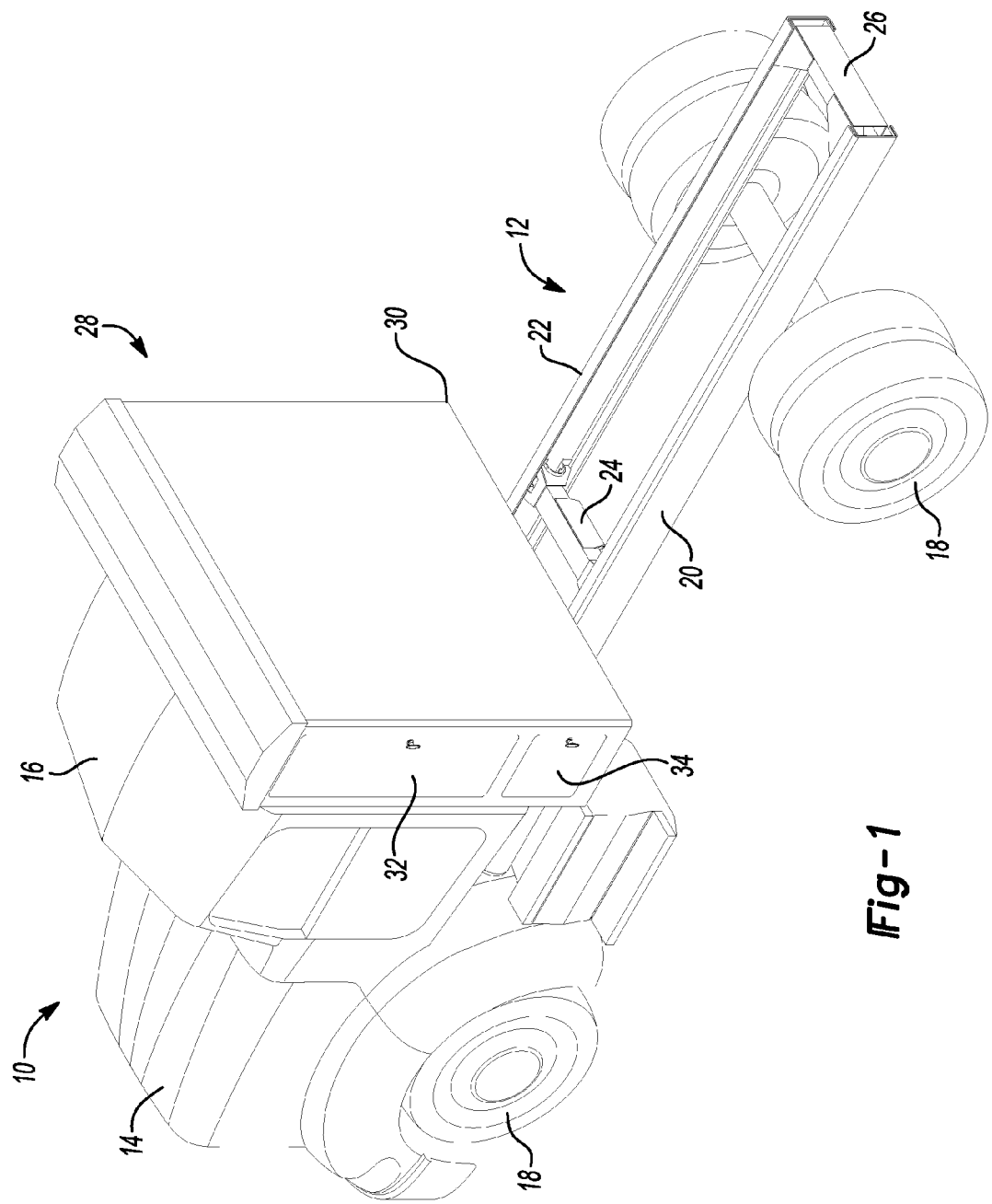
FIG. 1 is a perspective view of a truck outfitted with a compressed natural gas (CNG) fueling system.

Referring to FIG. 1, a truck 10 includes a frame 12 having a front end 14, cabin 16 and wheel/tire/axle assemblies 18 attached therewith. The frame 12 includes frame rails 20, 22, which are arranged generally parallel to and spaced apart from one another, and crossmembers 24, 26 attached with the frame rails 20, 22 to provide structural support for the frame rails 20, 22.

A compressed natural gas (CNG) fueling system 28 is supported on and attached with the frame rails 20, 22 and positioned behind the cabin 16. The CNG fueling system 28 provides for the storage of CNG that can be used to power movement of the truck 10. The CNG fueling system 28, in this example, includes a housing 30 with access panels 32, 34. And, the width is approximately equal to the width of the truck 10 so as to not significantly impact aerodynamic properties of the truck 10.

Figure 2:
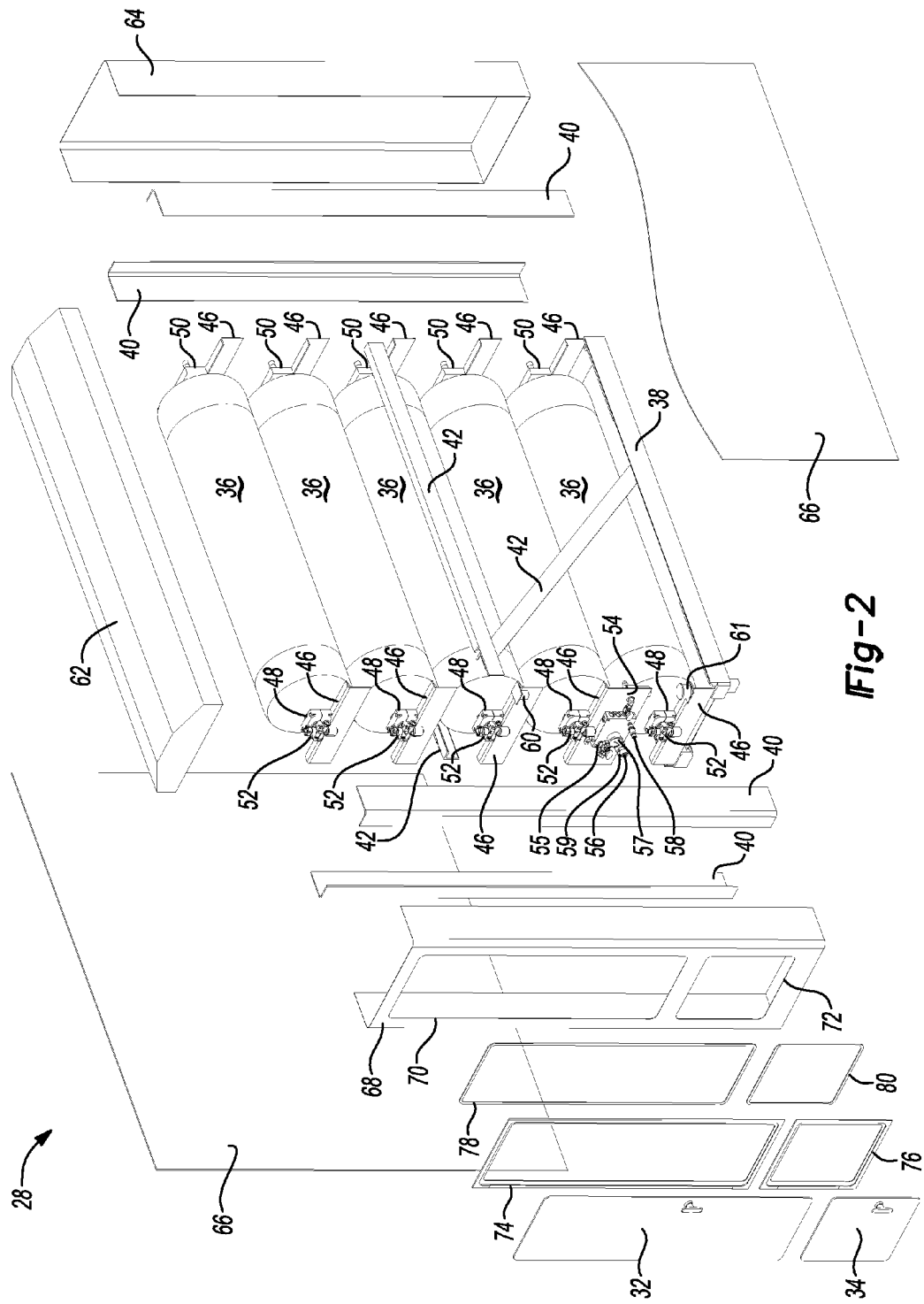
FIG. 2 is an exploded assembly view of a CNG fueling system.
Figure 3:
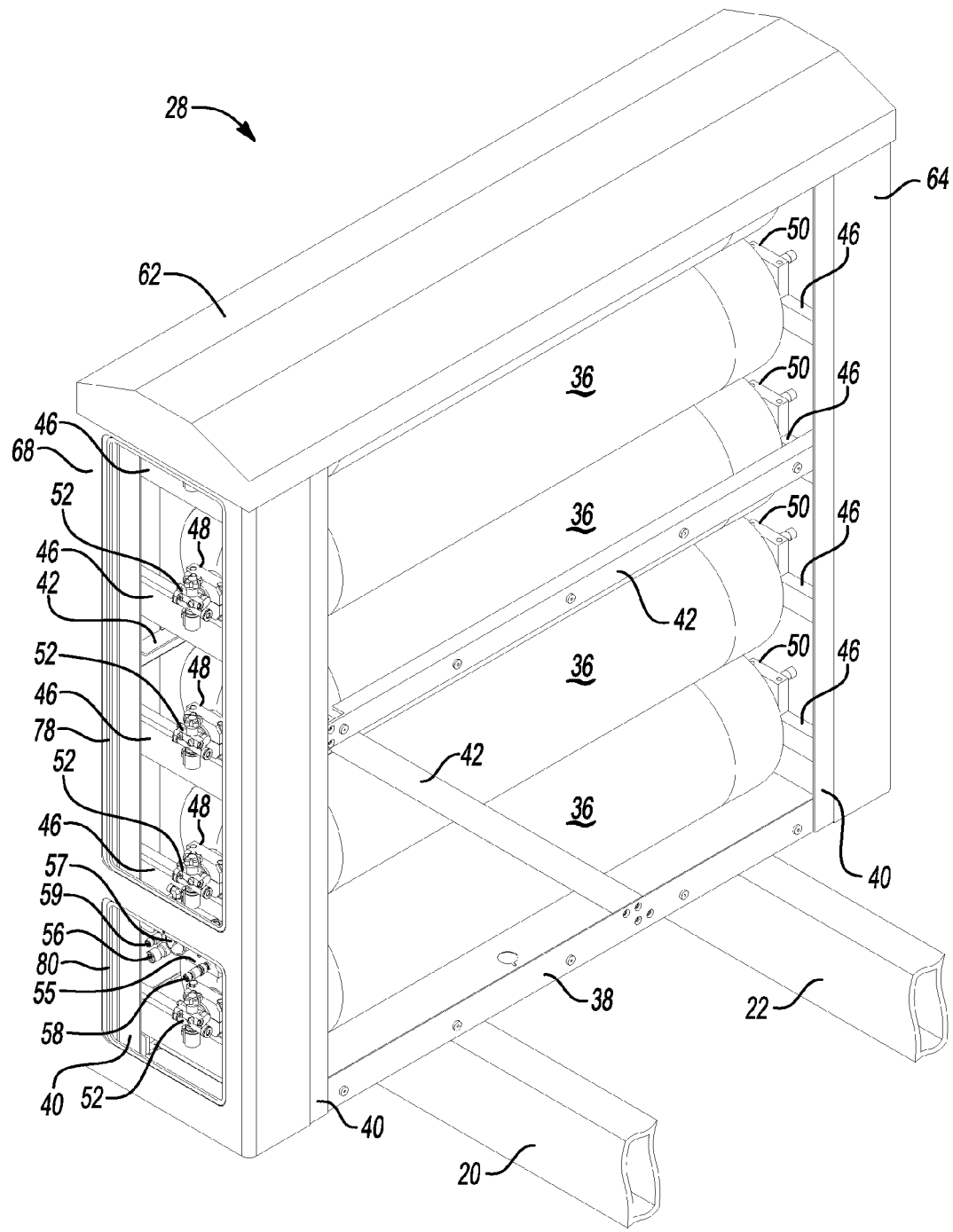
FIG. 3 is a perspective view of a CNG fueling system with access and side panels removed.
Figure 4:
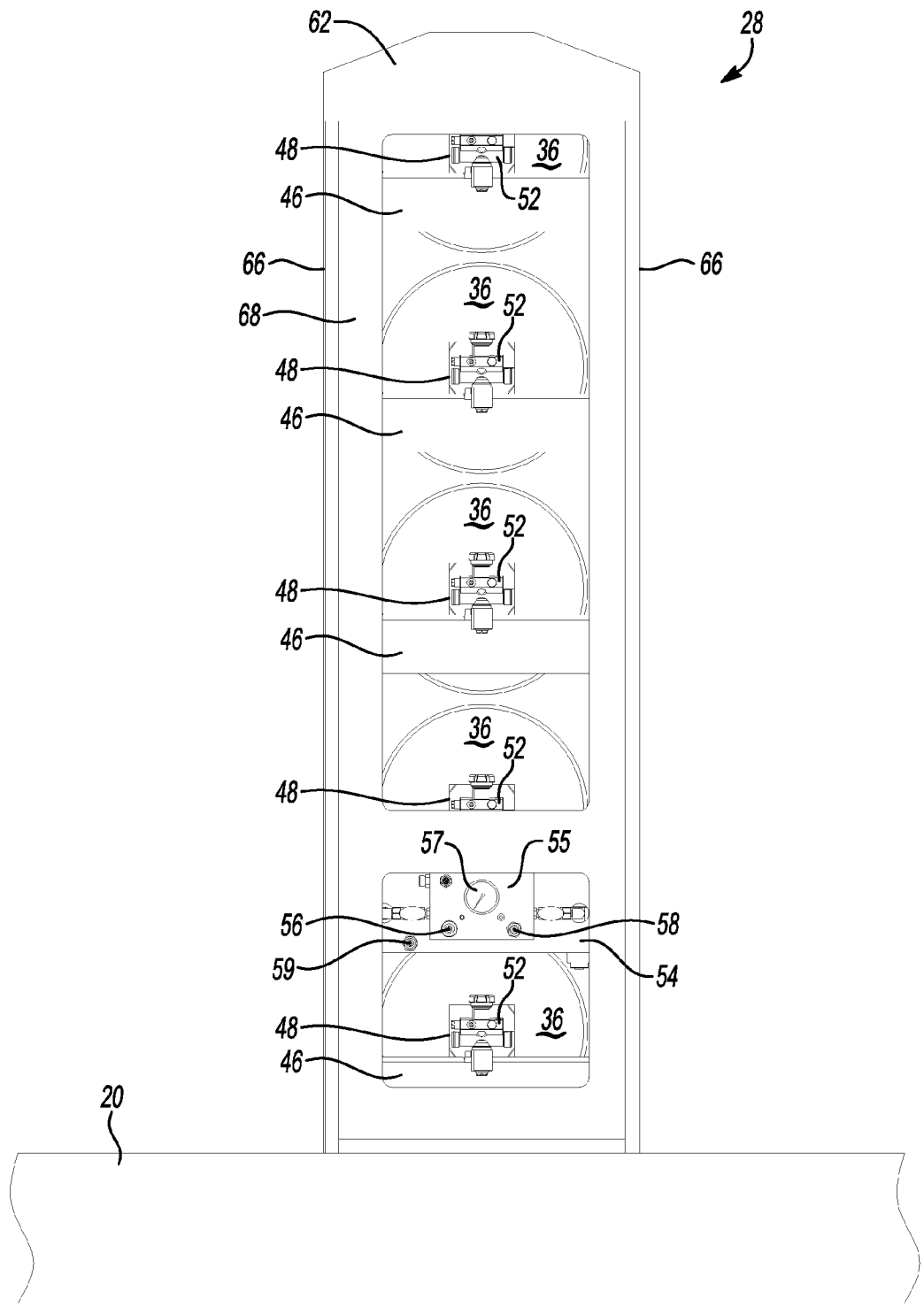
FIG. 4 is a front view of a CNG fueling system supported on frame rails.

Referring to FIGS. 2 through 4, the CNG fueling system 28 includes a plurality of cylindrical tanks 36 stacked, in this example, on their sides such that their axes are oriented generally perpendicular to the frame rails 20, 22. In other examples, the tanks 36 may take any suitable form and be arranged in any suitable fashion.

Base 38, corner brackets 40 and cross braces 42 are arranged to form a frame within which the tanks 36 are mounted. Tank supports 46 are attached between the corner brackets 40 to reinforce the frame and provide mounting structures for the tanks 36.

Each of the tanks 36 includes front and rear mounts 48, 50 at opposing ends. The mounts 48, 50 are attached with the tank supports 46. Loads associated with the tanks 36 are transferred through the mounts 48, 50 and tank supports 46 to the corner brackets 40 and base 38. A valve assembly 52 is also operatively associated with each of the tanks 36. The valve assemblies 52 provide fluid access to the tanks 36.

A manifold mounting bracket 54 is attached with the corner brackets 40 on a same end of the CNG fueling system 28 as the front mounts 48. A manifold assembly 55 operatively arranged with a fill receptacle 56, high and low pressure gages 57, and outlet ports 58, 59 is attached with the manifold mounting bracket 54. The fill receptacle 56 is configured to receive a fueling nozzle for CNG. The manifold assembly 55 defines a series of passageways that connect with the valve assemblies 52 via piping (not shown) to direct CNG from the fill receptacle 56 to at least one of the valve assemblies 52 to fill the corresponding tank(s) 36. The high and low pressure gages 57 are arranged to indicate pressures associated with the CNG fueling system 28 (e.g., pressures within the tanks 36, etc.) The manifold assembly 55 further defines a series of passageways that connect with the valve assemblies 52 via the piping to direct CNG from the tanks to the outlet ports 58, 59, when actuated, to empty the tanks 36.

A filter 60 and regulator 61 are attached with the tank supports 46 above and below the manifold mounting bracket 54 respectively. The outlet port 59 connects with the filter 60 and regulator 61 via piping (not shown). The filter 60, as the name suggests, filters CNG from the tanks 36 before it passes to the regulator 61. The regulator 61 controls the flow of CNG provided to an engine of the vehicle 10.

In other examples, the manifold assembly 55, fill receptacle 56, high and low pressure gages 57, outlet ports 58, 59, filter 60, and regulator 61 (and any other components) may be mounted in any suitable location on or within the CNG fueling system 28. The manifold assembly 55, filter 60 and/or regulator 61, for example, each could be located near a top and on a different side of the CNG fueling system 28, etc. The manifold assembly 55, in still other examples, may be omitted such that the fill receptacle 56 and outlet ports 58, 59 fluidly connect with the valve assemblies 52 via piping (not shown) or the like. That is, a manifold need not be used to distribute CNG from the fill receptacle 56 to the tanks 36. The fill receptacle 56, in one such arrangement, may be located near a corner of the CNG fueling system 28 adjacent to the base 38. Other arrangements are also contemplated.

As apparent to those of ordinary skill, the fill receptacle 56, high and low pressure gages 57, outlet ports 58, 59, filter 60 and regulator 61 (as well as the entirety of the CNG fueling system 28) is positioned above the frame rails 20, 22. That is unlike previous systems, the fill receptacle 56 and associated components arranged to fluidly interface with the valve assemblies 52 and piping are carried by the frame of the CNG fueling system 28. This eliminates the need for a separate fuel management module including one or more fill receptacles and associated fluid interface components to be attached with the vehicle 10 such that, for example, the one or more fill receptacles are located below a top of the frame rails 20, 22. Eliminating the aforementioned module reduces complexity and therefore assembly time as fewer independent components are attached with the vehicle 10. Put a different way, integrating the fuel management module with the CNG fueling system 28 frees up space on a side of the frame rail 20 that would otherwise be occupied by a separate fuel management module.

The housing 30 further includes a cap 62 arranged to cover the tanks 36, a rear panel 64 attached with the corner brackets 40 on a side of the housing 30 opposite the access panels 32, 34, and side panels 66 attached with the base 38 and corner brackets 40, and spanning a width of the CNG fueling system 28. The housing 30 further includes a front panel 68 attached with the corner brackets 40 and defining openings 70, 72 to accommodate the access panels 32, 34 respectively, and associated panel frames 74, 76 and seals 78, 80 respectively. Other examples may lack a housing in favor of a frame, etc.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A compressed natural gas fuel system comprising:
    a housing configured to be disposed behind a cabin of a truck;
    a plurality of tanks disposed within the housing, wherein each of the plurality of tanks includes front and rear mounts at opposing ends, the front and rear mounts are attached to tank supports, and the tank supports are attached between corner brackets to provide mounting structures for the plurality of tanks;
    a filter, regulator, and pressure gage each supported within the housing, wherein the filter is configured to filter fluid from the plurality of tanks, the regulator is configured to be in fluid communication with the filter, the pressure gage is configured to indicate a pressure associated with the fuel system, and the filter and the regulator are attached with the tank supports; and
    an inlet configured to receive a compressed natural gas fueling nozzle and be in fluid communication with the plurality of tanks, wherein the housing is further configured to be attached with and supported by frame rails of the truck such that the plurality of tanks and the inlet are positioned above the frame rails, and the plurality of tanks are stacked on each other such that axes of the plurality of tanks are oriented generally perpendicular to the frame rails.

2. The system of claim 1 further comprising a manifold supported within the housing and configured to direct fluid from the fueling nozzle toward the plurality of tanks.

3. The system of claim 1, wherein each of the plurality of tanks is generally cylindrical.

4. A compressed natural gas fuel system comprising:
    a frame configured to be disposed behind a cabin of a truck;
    a plurality of tanks disposed within and supported by the frame, wherein each of the plurality of tanks includes front and rear mounts at opposing ends, the front and rear mounts are attached to tank supports, and the tank supports are attached between corner brackets to provide mounting structures for the plurality of tanks;
    a filter, regulator, and pressure gage each supported by the frame, wherein the filter is configured to filter fluid from the plurality of tanks, the regulator is configured to be in fluid communication with the filter, the pressure gage is configured to indicate a pressure associated with the fuel system, and the filter and the regulator are attached with the tank supports; and
    a fill receptacle configured to receive compressed natural gas for the plurality of tanks, wherein the frame is further configured to be supported by frame rails of the truck such that the plurality of tanks and the fill receptacle are positioned above the frame rails, and the plurality of tanks are stacked on each other such that axes of the plurality of tanks are oriented generally perpendicular to the frame rails.

5. The system of claim 4 further comprising a manifold supported by the frame and configured to direct fluid received in the fill receptacle toward the plurality of tanks.

6. The system of claim 4, wherein each of the plurality of tanks is generally cylindrical.

* * * * *